Jan. 31, 1928.
J. D. LANGDON
1,658,000
LIQUID MEASURING VALVE
Filed Oct. 28, 1926
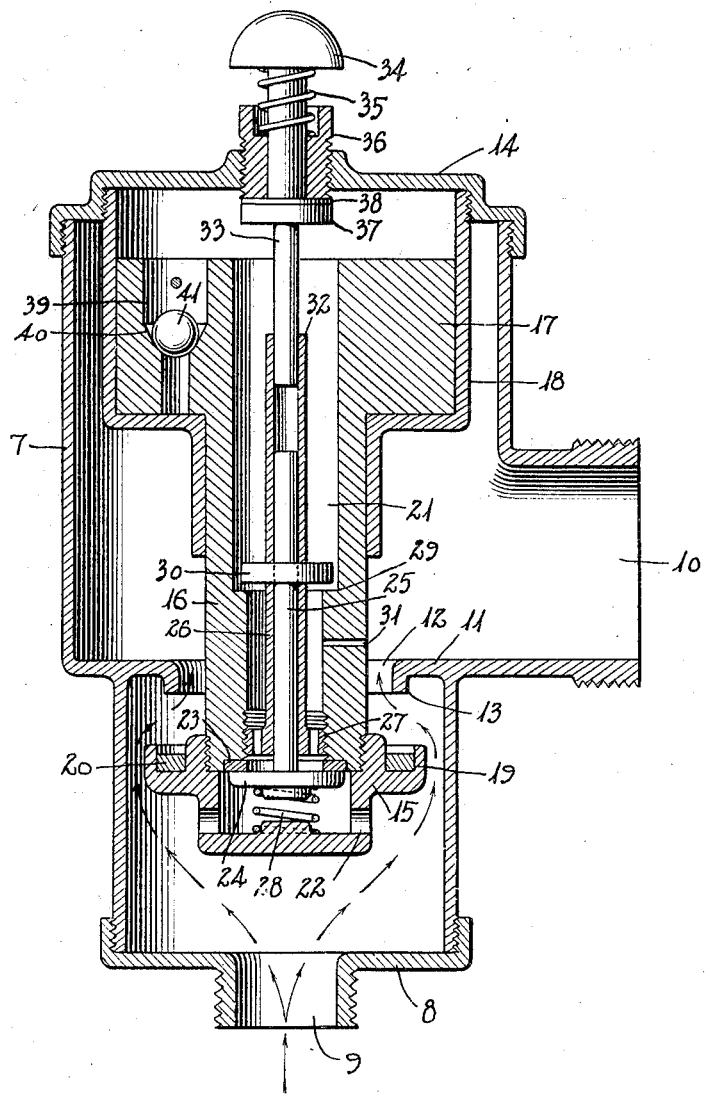
Inventor:
J. D. Langdon
By Monroe E. Miller
Attorney.

Patented Jan. 31, 1928.

1,658,000

UNITED STATES PATENT OFFICE.

JESSE D. LANGDON, OF LOS ANGELES, CALIFORNIA.

LIQUID-MEASURING VALVE.

Application filed October 28, 1926. Serial No. 144,828.

The present invention relates to valves for controlling the flow of water or other fluid, and aims to provide a novel and improved fluid or liquid measuring valve which, after being opened, will permit a predetermined flow of liquid before shutting off the flow automatically.

Another object is the provision of such a valve device comprising a novel construction and assemblage of the component elements, in order that the device will be practical and efficient in operation.

A further object is the provision of such a valve device having a chamber adapted to be filled with the liquid or fluid when the valve is opened and from which the liquid bleeds in order to close the valve and shut off the flow of liquid after a predetermined amount of liquid has passed through the device.

A still further object is to provide a valve device of the character indicated having a valve member and seat therefor of novel construction to enhance the efficiency of the device.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein the figure is a median section of the device, portions being shown in elevation.

In carrying out the invention there is provided a casing 7 having the removable bottom cap 8 provided with a fluid or liquid inlet 9, and the casing has a lateral outlet 10 between its ends. The casing is provided with a partition 11 between the inlet and outlet provided with an opening 12 and a depending annular flange or lip 13 surrounding said opening and forming a valve seat projecting in a direction opposite to the flow of liquid through the opening 12. The casing 7 has a top cap 14, and the caps 8 and 14 are screw-threaded on the body of the casing as shown. The casing may be used in upright position as shown or may be disposed in other positions if required.

The valve member or head 15 is in the form of a cap, as shown, and is screw-threaded on the lower end of a tubular stem 16 depending from a piston 17 working in a cylinder 18 having its upper end screw-threaded within the cap 14. The valve member 15 is thus supported for vertical or longitudinal movement within the casing 7 to and from the seat 13. The valve member 15 is provided with an annular groove 19 confronting the seat 13 and adapted to receive said seat when the valve member is seated, and a gasket 20 of rubber or other suitable material is disposed within the groove 19 to bear against the seat 13.

The piston stem 16 and piston 17 have a longitudinal passage 21 extending therethrough for the flow of liquid to and from the chamber of the cylinder 18 above the piston, and the cap-shaped valve member 15 has apertures 22 establishing communication between the inlet 9 and lower end of the passage 21. The stem 16 has a valve seat 23 at its lower end against which a starting valve 24 is normally seated upwardly to shut off the flow of liquid from the inlet 9 into the passage 21. The valve 24 has an upstanding stem 25 slidable within an upstanding tubular guide 26 carried by an apertured plug 27 screw-threaded within the lower portion of the passage 21. A coiled spring is confined between the valve 24 and member 15 to normally seat said valve.

The passage 21 of the piston stem 16 is formed with a shoulder 29 with which a disk 30 is cooperable, said disk being slidable on the valve stem 25 above the shoulder 29, and the tubular guide 26 serves as a stop or seat to limit the downward movement of the disk 30 and support it above the shoulder 29. By adjusting the plug 27 the clearance between the shoulder 29 and disk 30 may be adjusted, in order to regulate the bleeding of the liquid from the chamber of the cylinder 18, as will hereinafter more appear. The piston stem 16 is provided below the shoulder 29 and above the partition 11 with a bleed opening 31 communicating with the outlet 10 for the discharge of the liquid from the passage 21, and the opening 31 is of less area than the aggregate area of the apertures in the plug 27. A tube 32 is slidable on the upper terminal of the stem 25 and serves as a weight bearing on the disk 30 to prevent excessive upward movement of said disk.

In order to open the starting valve 24, a plunger or push rod 33 is slidable through the cap 14 and has a push button or knob 34 at its upper end, with a coiled spring 35 confined between said button 34 and an adjustable plug 36 screw-threaded within the cap 14 through which the plunger 33 slides. The plunger 33 has a collar 37 below the plug 36 to limit the upward movement of the plunger, and a cushion or gasket 38 is disposed on the plunger 33 between the collar 37 and plug 36 to prevent leakage through the aperture of the plug 36 and to cushion the plunger 33 at the limit of its upward movement. The lower end of the plunger 33 enters the tube 32 to contact with the valve stem 25 when the button 34 is depressed.

The piston 17 has a passage 39 extending therethrough parallel with its axis to establish communication between the upper and lower chambers of the cylinder above and below the piston, and said passage is formed with a valve seat 40 on which a ball valve 41 is seatable to serve as a check valve to permit the fluid to flow upwardly through the passage 39 but not downwardly therein.

In operation, with the gasket 20 of the valve member 15 seated against the seat 13, the piston 17 is in its upper position, and the flow of liquid from the inlet 9 to the outlet 10 is shut off. It has been found that by the provision of the valve seat 13 projecting in a direction opposite to the direction of flow of liquid and entering the groove 19 in contact with the gasket 20, will keep the valve tightly closed even under high pressures, so that the valve may be used with high pressures to advantage, as well as with low pressures. To open the valve and start the flow of liquid, the button 34 is depressed, so that the plunger 33 contacts with and depresses the valve stem 25, thereby unseating the valve 24. The liquid below the valve member 15 being under pressure will cause the liquid to flow upwardly through the apertures 22 and passage 21 into the cylinder 18 above the piston 17, thereby filling the upper chamber of the cylinder and depressing the piston 17 which is of larger diameter than the valve member 15, thereby moving the valve member 15 downwardly, as seen in the drawing. Furthermore, as soon as the valve member 15 starts to open, the liquid being directed downwardly by the valve seat 13 into the groove 19, will assist in opening the valve quickly. The bleed opening 31 being of smaller area than the area of the apertures in the plug 27, will result in the liquid flowing upwardly through the passage 21 into the cylinder 18 although a small portion of the liquid may flow through the bleed opening 31. The disk 30 may be moved upwardly on the stem 25 as the liquid flows upwardly through the passage 21, but will move down and seat on the tubular guide 26 as soon as the upward flow of liquid through the passage 21 has stopped. When the piston 17 is moved downwardly, any liquid trapped within the cylinder 18 below the piston may pass upwardly through the passage 39, but the valve 41 seating on the seat 40 will prevent the downward flow of the liquid through the piston 17.

With the valve member 15 moved away from the seat 13 the flow of liquid through the casing 7 from the inlet 9 to the outlet 10 is established, and the closing of the valve is resisted by the liquid in the cylinder 18, the valve 24 being closed after the push button 34 is released, so that the liquid in the cylinder 18 above the piston 17 must bleed out through the bleed opening 31 to the outlet 10 in order to permit the valve to close. The time that is required for the valve to close is regulated by the restriction in the bleeding of the liquid from the cylinder. This is determined by adjusting the disk or restricting member 30 closer to the shoulder 29 in order to restrict the bleeding of the liquid from the cylinder and therefore increase the time that the valve is kept open, which will also increase the volume of liquid permitted to flow through the device. The valve member 15 is urged toward the seat by the pressure of the liquid against the valve member, and the valve member is gradually moved toward the seat 13 as the liquid bleeds from the cylinder 18 through the passage 21 and opening 31. Thus, after the liquid has been bled from the cylinder 18 the valve member 15 will be seated to shut off the flow of liquid after a predetermined flow of the liquid through the device.

The piston 17, cylinder 18 and other parts which compel the regulated slow closing movement of the valve member 15 constitutes a dash pot which, by admitting liquid under pressure from the inlet will quickly open the valve, and which, by restricting the bleeding of the liquid after the valve is opened, will slow down the closing movement of the valve member 15 under the liquid pressure.

Having thus described the invention, what is claimed as new is:—

1. A valve device of the character described comprising a casing having an inlet and an outlet and a valve seat between them, a valve member movable against said seat in the direction of liquid flow from the inlet to the outlet, a cylinder in the casing, a piston working in the cylinder and having a stem connected to said valve member, said stem having a passage therethrough for the flow of liquid under pressure from the inlet into said cylinder to move the piston for opening said valve member, a valve normally closing said passage and having a stem, a tubular guide for the second named stem adjustably mounted in said passage, said passage having a shoulder and having a bleed opening between said shoulder and valve, and a member for restricting the flow of liquid from the cylinder to said bleed opening cooperable with said shoulder and adapted to bear against said guide to provide a desired clearance between the last named member and shoulder.

2. A valve device of the character described comprising a casing having an inlet and an outlet and a valve seat between them, a valve member movable against said seat in the direction of liquid flow from the inlet to the outlet, a cylinder in the casing, a piston working the cylinder and having a stem connected to said valve member, said stem having a passage therethrough for the flow of liquid under pressure from the inlet into said cylinder to move the piston for opening said valve member, a valve normally closing said passage, said passage having a shoulder and having a bleed opening between said shoulder and valve, a member movable away from and toward said shoulder when the liquid flows through said passage into and out of the cylinder, respectively, and adjustable means for limiting the movement of the last-named member toward said shoulder to regulate the flow of liquid from the cylinder to said bleed opening.

In testimony whereof I hereunto affix my signature.

JESSE D. LANGDON.